United States Patent [19]
Koch

[11] 4,280,318
[45] Jul. 28, 1981

[54] INFINITE REEL ADJUSTMENT MECHANISM

[75] Inventor: Earl E. Koch, Mohnton, Pa.

[73] Assignee: Sperry Corporation, New Holland, Pa.

[21] Appl. No.: 136,656

[22] Filed: Apr. 2, 1980

[51] Int. Cl.³ .......................................... A01D 57/04
[52] U.S. Cl. ..................................................... 56/221
[58] Field of Search ................................ 56/219-225, 56/208, 14.4

[56] References Cited

U.S. PATENT DOCUMENTS

| | | | |
|---|---|---|---|
| 2,873,567 | 2/1959 | Vogelaar et al. | 56/221 |
| 3,599,410 | 8/1971 | Coene et al. | 56/221 |
| 3,945,180 | 3/1976 | Sinclair | 56/221 |

Primary Examiner—Robert A. Hafer
Attorney, Agent, or Firm—Larry W. Miller; Frank A. Seemar; James R. Bell

[57] ABSTRACT

An infinite adjustment mechanism for a harvesting machine on which a hydraulic cylinder is utilized to raise and lower the reel relative to the ground is disclosed wherein the hydraulic cylinder is connected to a link pivotally mounted on the frame of the crop harvesting header and is adjustably positionable by a draw bolt. This hydraulic cylinder mounting linkage allows the minimum reel height, relative to the cutterbar, to be easily adjusted with simple, ordinary tools in an infinite number of positions within the limits imposed by the lengths of the draw bolt and the pivoting link. A clamping mechanism is provided to lock the pivoted link into a preselected position relative to the frame of the crop harvesting header.

9 Claims, 5 Drawing Figures

INFINITE REEL ADJUSTMENT MECHANISM

BACKGROUND OF THE INVENTION

The present invention relates generally to crop harvesting machines and, more particularly, to an infinite reel adjustment mechanism for use in conjunction with a hydraulic reel lifting assembly.

Generally, crop harvesting machines include a crop harvesting header mounted at the forward end thereof to initiate the crop harvesting process. Headers have been developed for utilization in different crops and/or crop conditions. Combines, for example, utilize different crop harvesting headers for soybeans and small grain. Normally, the header operates to cut standing crop material, consolidate it and then convey it rearwardly to the harvesting machine for further harvesting treatment.

Generally, a reel is utilized on the headers to engage standing crop material forward of the cutterbar, pull it rearwardly over the cutterbar, which severs the crop material from the ground, and then convey the severed crop material rearwardly toward the harvesting machine. Often, a consolidating means, such as an auger, is mounted in the header rearwardly of the reel to receive the severed crop material conveyed rearwardly by the reel and consolidate it before feeding rearwardly toward the crop harvesting machine.

It has been found that repositioning the reel relative to the cutterbar, in response to different types and conditions of crop material being harvested, is important to efficient harvesting. For example, efficient harvesting of soybeans necessitates a low positioning of the reel relative to the cutterbar to sweep the crop over the cutterbar and minimize crop loss; however, grain crops normally require a relatively high reel positioning to minimize crop losses. Furthermore, downed crops, where the crops are matted next to the ground, are best harvested by a reel which reaches forwardly of and somewhat below the cutterbar to pick up the downed crop before being severed by the cutterbar.

It is known that grain crops will vary in height above the ground within the same field. To provide for proper reel placement to efficiently harvest such crops of varying sizes, reel assemblies have been equipped with selectively variable reel height controls to selectively vary the height of the reel relative to the cutterbar and, therefore, the ground. One such height control mechanism can be found in U.S. Pat. No. 3,599,410 in the form of hydraulic cylinders mounted between the header frame and the reel arms which are operable to raise and lower the reel.

The hydraulic cylinders are operable within a limited range having a maximum reel height and a minimum reel height relative the cutterbar, with the hydraulic cylinder "bottoming out" at the minimum reel height position. This limited range is generally sufficient to enable the operator to meet the varying conditions found in each crop; however, since reels are also adjustable in a fore-and-aft direction, it is desirable to have the capability of varying the position of the reel when the hydraulic "bottoms out". In this manner, the reel could be moved in a fore-and-aft direction and still be vertically positioned to maintain the proper minimum reel height relative to the cutterbar.

One method for solving this problem was to mount the base of the hydraulic cylinder in a bracket having a series of holes therein so that the operator could selectively vary, within a small finite number, the positions at which the range of the hydraulic cylinder would start; that is, the mounting of the hydraulic cylinder would set the minimum reel height position relative to the cutterbar. This mounting bracket can be seen in the aforementioned U.S. Pat. No. 3,599,410. While this mechanism is practical, it does have the problem of being cumbersome, e.g. difficult to change from one mounting to another, and of being somewhat limited, i.e. setting the minimum reel height position at a location, corresponding to a mounting between the holes in the bracket, wasn't possible. Furthermore, the weight of the reel assembly had to be supported while the hydraulic cylinder was moved from one mounting hole to another, leading to further complications.

SUMMARY OF THE INVENTION

It is an object of this invention to overcome the aforementioned disadvantages of the prior art by providing a mounting for the hydraulic reel lift mechanism that is infinitely adjustable.

It is another object of this invention to provide a mounting linkage for the hydraulic cylinder on a harvester reel assembly that can be utilized for infinitely positioning the height of the reel when the hydraulic cylinder is completely retracted within a given range of positions.

It is still another object of this invention to provide a mounting mechanism for the hydraulic cylinder of a harvester reel assembly which is easily adjustable to vary the minimum reel height above the cutterbar.

It is a further object of this invention to provide a clamping mechanism to lock the infinitely adjustable hydraulic cylinder mounting linkage into a fixed position against the header frame in order to reduce stress in the components of the mounting linkage during operation of the hydraulic cylinder.

It is an advantage of this invention that adjustment of the minimum reel height position can be made with simple, ordinary tools.

It is a feature of this invention that, with an infinitely adjustble mounting mechanism positioned on each side of the crop harvesting header, an adjustment can be made to each side of the reel substantially independently of the other side.

It is a still further object of this invention to provide an infinitely adjustable mounting for the hydraulic cylinder lift mechanism of a reel assembly which is durable in construction, inexpensive in manufacture, fasile in assemblage, and simple and effective in use.

These and other objects, features and advantages are accomplished according to the instant invention by providing an infinite adjustment mechanism for a harvesting machine on which a hydraulic cylinder is utilized to raise and lower the reel relative to the ground wherein the hydraulic cylinder is connected to a link pivotally mounted on the frame of the crop harvesting header is adjustably positionable by a draw bolt. This cylinder mounting linkage allows the minimum reel height, relative to the cutterbar, to be easily adjusted with simple, ordinary tools in an infinite number of positions within the limits imposed by the lengths of the draw bolt and the pivoting link. A clamping mechanism is provided to lock the pivoted link into a preselected position relative to the frame of the crop harvesting header.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE INVENTION

Figure 1:
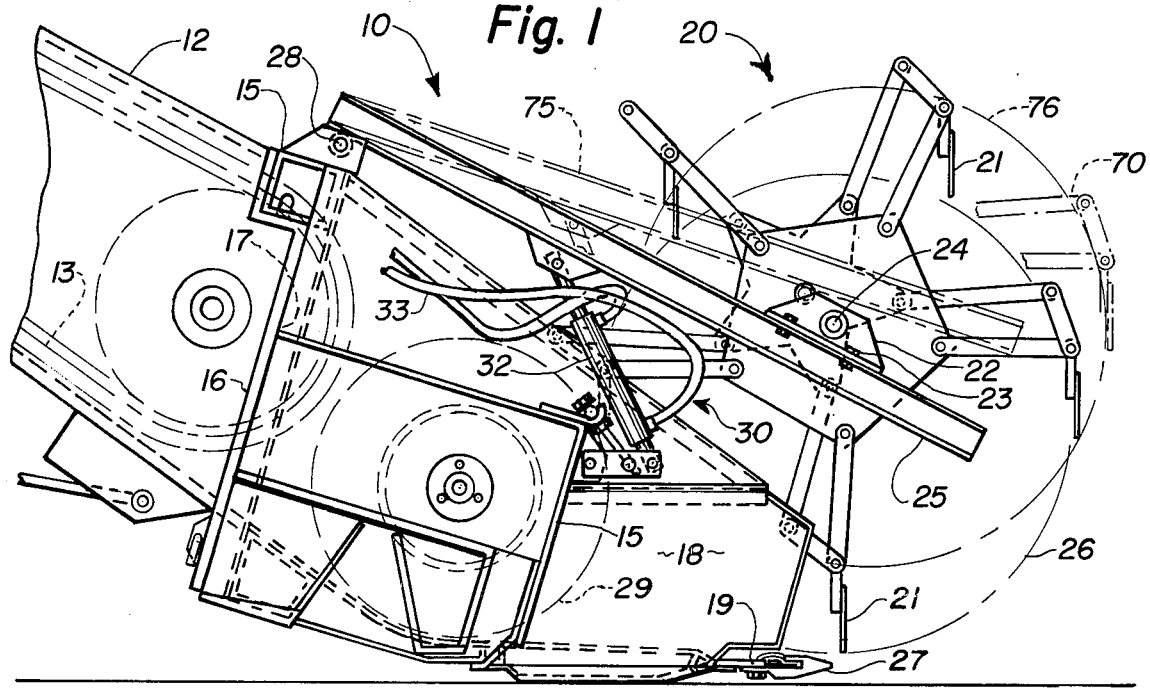
FIG. 1 is a side elevational view of a crop harvesting header mounted to a crop harvesting machine, commonly referred to as a combine, incorporating the principles of the instant invention, the drives for the reel, cutterbar and auger being removed for clarity.

Referring now to the drawings and, particularly to FIG. 1, a side elevational view of a crop harvesting header attached to the front of a crop harvesting machine can be seen. Left and right references are used as a matter of convenience and are determined by standing at the rear of the machine facing the forward end, the direction of travel. For reasons of clarity, no drives to the operative parts of the crop harvesting header have been shown in the drawings. Such drives are conventional and are well known in the art.

The crop harvesting header 10 is shown mounted on the forward end of a feeder house 12 which, in turn, extends from a crop harvesting machine (not shown). In general, the header operates to sever standing crop material from the ground and deliver it rearwardly to the feeder house 12. The severed crop material is then conveyed to the crop harvesting machine by the feeder conveyor 13 for further harvesting treatment. The frame 15 of the crop harvesting header 10 supports a rear wall 16, having a crop outlet opening 17 through which crop material is fed to the feeder conveyor 13, and opposing forwardly extending side sheets 18. Only one side of the crop harvesting header 10 is shown in the drawings, and, since both sides are substantially identical, the description of one will suffice as the description for both.

A cutterbar 27 is mounted on the forward edge 19 of the crop harvesting header 10 adjacent the ground to sever standing crop material as the header progresses across the field. A reel 20 is rotatably mounted about a axis of rotation 24 generally above the cutterbar 27. The reel 20 includes a plurality of tines 21 mounted on said reel for rotation therewith, the path of movement of the tines 21 being generally indicated by the circular arc 26. As can be seen in FIG. 1, it is generally desirable to position the reel 20 so that the tine path 26 is in close proximity to the cutterbar 27.

The reel 20 is rotatably mounted to a fore-and-aft adjustment bracket 22 which is adjustably mounted for movement in a fore-and-aft direction along the length of the reel arm 25. The reel arm 25 is pivotally connected to the frame 15 by a horizontally disposed pivot 28 such that the reel arm 25 is pivotally movable in a vertical plane. The fore-and-aft adjustment bracket 22 can be positioned along the length of the reel arm 25 by loosening the bolts 23, moving the adjustment bracket 22 to the desired position and tightening the bolts 23. In this manner, the reel 20 can be moved to a plurality of fore-and-aft positions relative to the cutterbar 27 to efficiently harvest different crops under different crop conditions.

As a description of the general operation, the reel 20 engages standing crop material forwardly of the cutterbar 27, sweeps it rearwardly over the cutterbar 27 to be severed thereby and then conveys the severed crop material rearwardly to the consolidating auger 29, which consolidates the severed crop material and discharges it through the crop discharge opening 17 to be conveyed further rearwardly by the feeder house conveyor 13. Different crops and/or harvesting conditions require different positions of the reel 20 relative to the cutterbar 27 to efficiently harvest the crop and minimize crop losses.

To raise and lower the reel 20 relative to the cutterbar 27 during the harvesting operation, a lift mechanism 30 is attached to the reel arm 25 to selectively pivot the reel arm 25 about the horizontally exposed pivot 28. In the preferred embodiment seen in the drawings, the lift mechanism 30 includes a hydraulic cylinder 32 powered by hydraulic fluid circulating through the hydraulic hoses 33. The hydraulic cylinder 32 is operable within a limited range between a completely extended position and a completely collapsed position, which correspond, respectively, to a maximum reel height above the cutterbar 27 and a minimum reel height above the cutterbar 27.

The completely collapsed state of the hydraulic cylinder 32 serves as a positive stop to prevent the path 26 of the tines 21 from intersecting the cutterbar 27. However, when the reel 20 is adjusted in a fore-and-aft direction by manipulation of the adjustment bracket 22, the relationship between the tine path 26 and the cutterbar 27 undergoes a corresponding change. Accordingly, it is desirable to adjust the minimum reel height position, as determined by the collapsed position of the hydraulic cylinder 32, so as to maintain the desired relationship between the tine path 26 and cutterbar 27.

Figure 2:
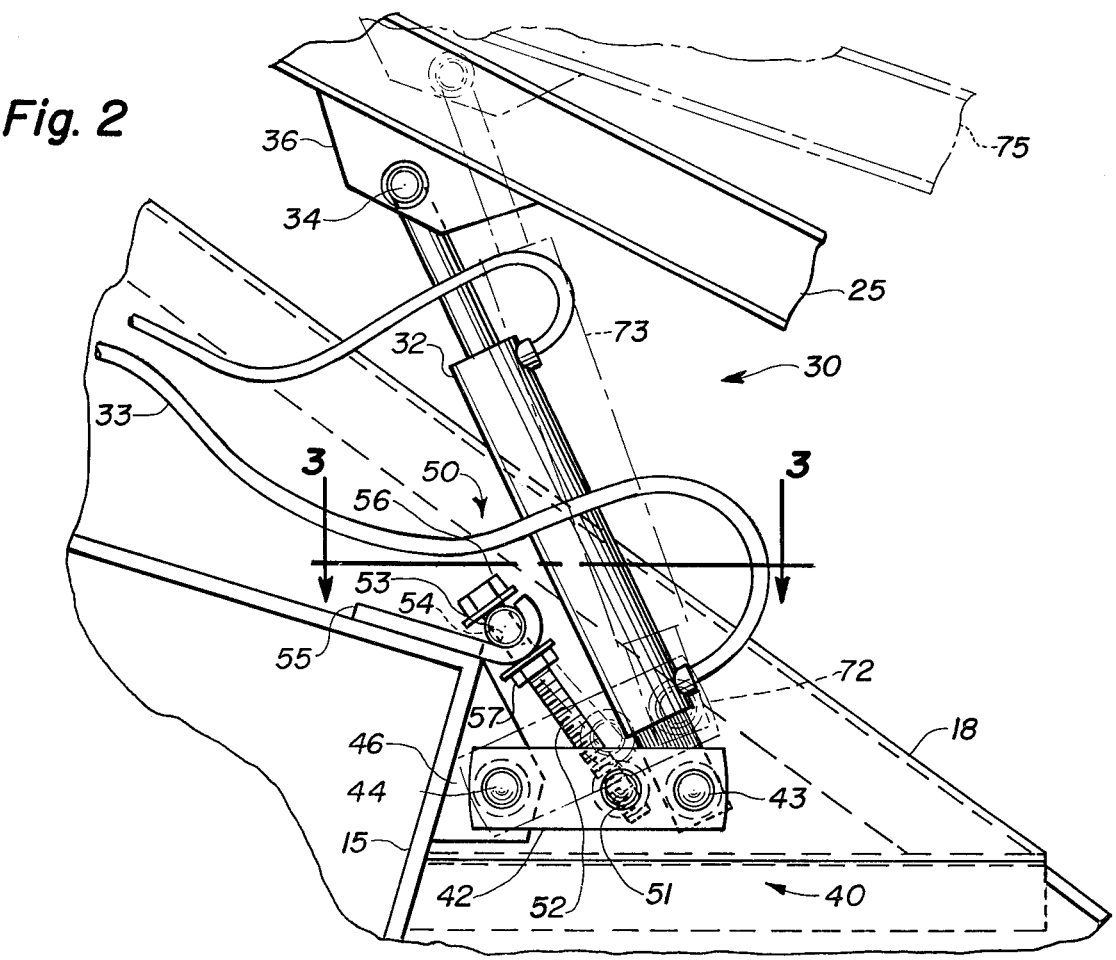
FIG. 2 is an enlarged side elevational view of a portion of the crop header seen in FIG. 1 showing in detail the infinitely adjustable mounting linkage forming a part of the instant invention.
Figure 3:
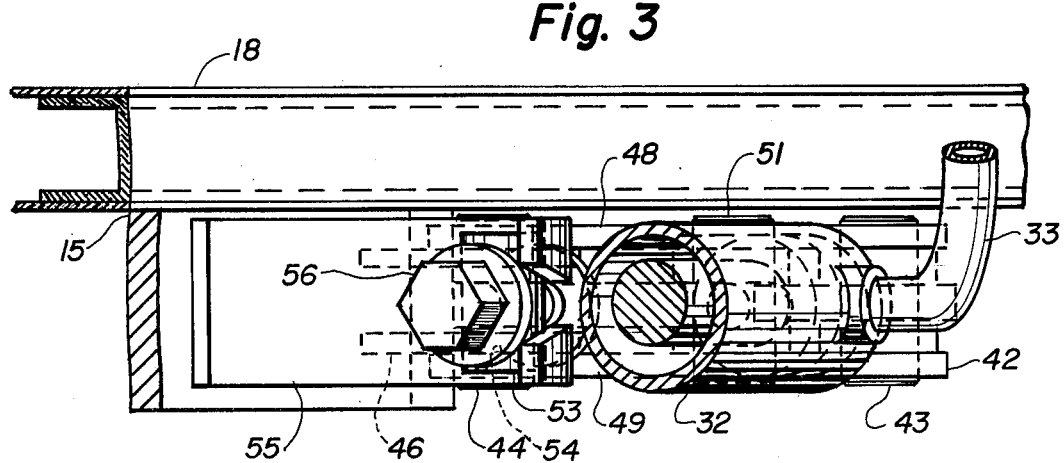
FIG. 3 is a cross sectional view showing the top of the infinitely adjustable mounting linkage taken along lines 3—3 of FIG. 2.

Referring now to the enlarged side elevational view seen in FIG. 2 and the top cross sectional view seen in FIG. 3, the improved reel lift mechanism can best be seen. The hydraulic cylinder 32 is pivotally attached to the reel arm 25 by a pivot 34 carried by a reel arm mounting tab 36. The hydraulic cylinder 32 is also pivotally connected by a pivot 43 at its lower end to a mounting linkage 40 having an elongated link 42. The link 42, is in turn, pivotally connected to a mounting tab 46 extending from the frame 15 by a pivot 44, the pivot 44 being spaced from the pivot 43. Since the pivot 44 is stationarily mounted relative to the frame 15, the link 42 is pivotably movable in a substantially vertical plane about the generally horizontally disposed pivot 44. Reference to FIG. 3 will reveal the preferred construction of the link 42 as having an interior half 48 and an exterior half 49. The pivots 43, 44 and 51 being carried between the two link halves 48 and 49.

An infinite adjustment mechanism 50, seen in the preferred embodiment in the form of a draw bolt 52, is pivotally connected to the link 42 by the pivot 51. The draw bolt 52 is stationarily anchored to the frame 15 through a J-shaped restraining bracket 55 and threaded through the pivot 51. A support dowel 53, having a hole 54 therein through which the draw bolt 52 passes, uniformly distributes stresses imposed through the draw bolt 52 across the width of the J-shaped restraining bracket 55. The bolt head 56 prevents the draw bolt 52 from passing downwardly through the support dowel 53, while a locking nut 57, threaded onto the draw bolt 52 below the bracket 55, prevents the draw bolt 52 from passing upwardly through the support dowel 53.

To rotate the mounting linkage 40 about the stationary pivot 44 in an upward direction, the locking nut 57 is rotated downwardly along the length of the draw bolt 52, after which, the bolt head 56 is rotated drawing the pivot 51 (which is threaded onto the draw bolt 52) upwardly until the desired rotation of the mounting linkage 40 has been attained. The locking nut 57 is then rotated upwardly into position against the restraining bracket 55 to lock the draw bolt 52 and the mounting linkage 40 into the selected position. To rotate the mounting linkage 40 in a downward direction, the adjusting bolt head 56 is rotated to draw the pivot 51 downwardly until the desired position is attained after which the locking nut 57 is rotated upwardly into position against the restraining bracket 55 to lock the mounting linkage into the desired position.

Rotation of the mounting linkage 40, as described in the preceding paragraph, raises or lowers the hyraulic cylinder 32 which, in turn, effects the corresponding movement of the reel arm 25 and the attached reel assembly 20. The phantom position of the link 72, the hydraulic cylinder 73 and the reel arm 75, as seen in FIG. 2, as well as the phantom position of the reel 70 and tine path 76, as seen in FIG. 1, are merely demonstrative of one of the infinite number of reel positions possible through manipulation of the infinite adjustment mechanism 50 to establish the minimum reel height position, as determined by the collapsed state of the hydraulic cylinder 32, at the desired location relative to the cutterbar 27. As can be seen, adjustment of the minimum reel height can be accomplished easily and practically with simple, ordinary tools.

If, for example, the operator will be encountering areas of downed crop, that is where the crop material is matted in a substantially prone position next to the ground, he might adjust the fore-and-aft position of the reel 20 forward of the position seen in FIG. 1 so that the tine path 26 dips downwardly close to the ground forward of the cutterbar 27. To prevent the tines 21 from impacting the cutterbar 27, the operator can manipulate the infinite adjustment mechanism 50 to rotate the mounting linkage 40 in an upward direction and, thereby, set the minimum reel height position such that the tines 21 clear the cutterbar 27.

On the other hand, if a relatively tall crop, such as maize, is to be harvested, the reel assembly 20 can be moved rearwardly along the reel arm 25 so that the tines 21 do not engage the crop as far forwardly of the cutterbar 27 as seen in FIG. 1. The operator can then manipulate the infinite adjustment mechanism 50 to set the minimum reel height position as he desires to minimize crop loss. One skilled in the art will readily realize that the minimum reel height can be set in an infinite number of positions within the limits defined by the length of the draw bolt 52.

Figure 4:
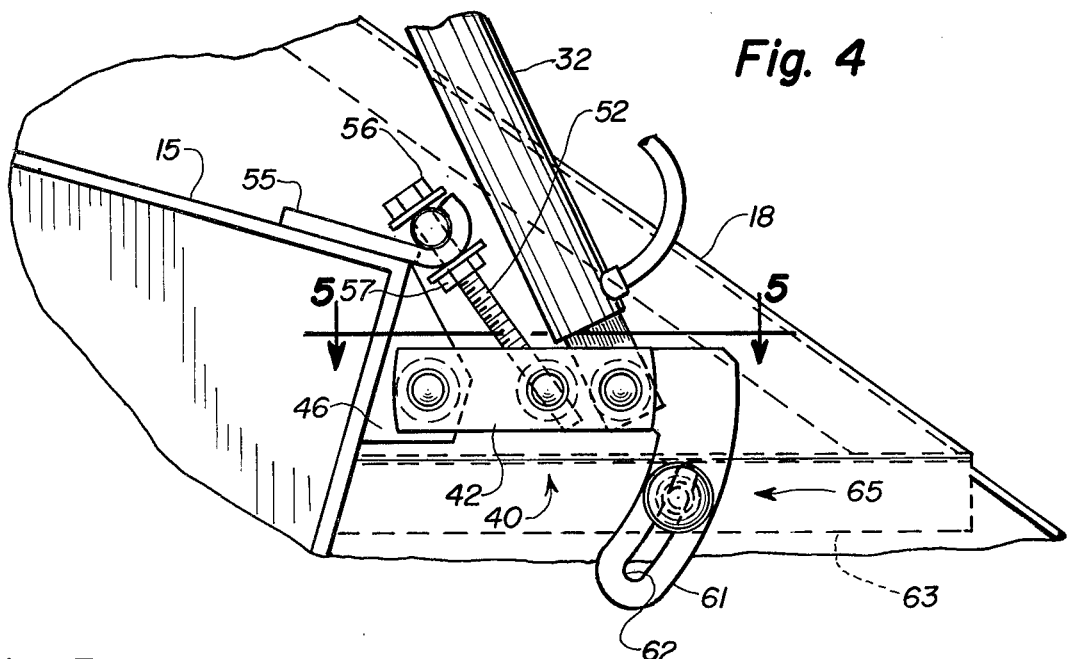
FIG. 4 is an enlarged side elevational view similar to FIG. 2 showing an alternative embodiment of the infinitely adjustable mounting link.
Figure 5:
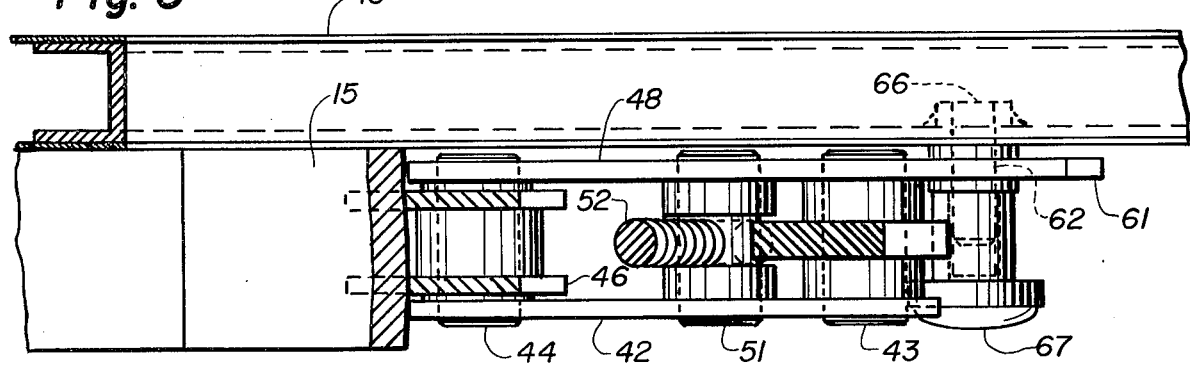
FIG. 5 is a cross sectional view taken along lines 5—5 of FIG. 4.

Referring now to FIGS. 4 and 5, an alternative embodiment of the mounting linkage 40 can be seen. In some harvesting machines, such as those harvesting machines commonly referred to as windrowers, the reel will undergo a bouncing movement about the horizontal pivot 28 during the mobile harvesting operation. In the embodiment of the mounting linkage 40 seen in FIG. 2, the draw bolt 52 would have to be of sufficient size to withstand the stresses imposed by the forces resulting from the bouncing reel 20. To minimize the size of the draw bolt 52 by reducing the potential for stress therein, the embodiment of the mounting linkage 40 seen in FIGS. 4 and 5 includes a clamping mechanism 65 to lock the mounting linkage 40 into the preselected position against the frame 15.

A clamping leg 61, having a slotted hole 62 therein, projects from the interior half 48 of the link 42 to a position adjacent a frame member 63. The clamping mechanism 65 is shown in the form of a threaded bolt stationarily mounted in the frame member 63 to project through the slotted hole 62. A clamping knob 67 threaded onto the bolt 66 locks the clamping leg 61 and, therefore, the mounting linkage 40 into position against the frame member 63. The higher forces exerted by the bouncing reel 20 are then spread into the frame member 63 to reduce the potential for high stresses in the draw bolt 52 and the rest of the mounting linkage 40; therefore, the individual components of the mounting linkage 40, such as the draw bolt 52 and the pivots 43, 44 and 51, can be constructed less substantially without being subject to damage. One skilled in the art will readily realize that other forms of the clamping mechanism 65 other than the preferred embodiment seen in FIGS. 4 and 5 can effectively lock the mounting linkage 40 against the frame 15 to reduce the stress occurring in the draw bolt 52.

One skilled in the art will further realize that, by locating the pivot 51 between pivots 43 and 44, the operator can effect a larger amount of movement of the hydraulic cylinder 32 through a smaller displacement of the draw bolt 52. An alternative embodiment of the mounting linkage 40 would have the stationary pivot 44 positioned between pivots 43 and 51, depending on the structure of the frame 15. Whenever the distance between the pivots 51 and 44 is shorter than the distance between the pivots 43 and 44, the hydraulic cylinder 32 will move a greater distance than the draw bolt 52 is displaced.

It will be understood that various changes in the details, material, steps and arrangement of parts which have been described and illustrated to explain the nature of the invention, will occur to and may be made by those skilled in the art upon a reading of the disclosure within the principles and scope of the invention. The foregoing description illustrates preferred embodiments of the invention. However, concepts, as based upon such description, may be employed in other embodiments without departing from the scope of the invention. Accordingly, the following claims are intended to protect the invention broadly as well as in the specific form shown herein.

Having thus described the invention, what is claimed is:

1. In a crop harvesting header disposed on a mobile crop harvesting machine for movement over the ground to harvest standing crop material having a frame adapted for connection to said mobile crop harvesting machine; a generally upright rear wall; first and second spaced apart side walls extending forwardly from said rear wall; a transversely disposed cutterbar positioned substantially completely between said side walls forwardly of said rear wall, said cutterbar being operable to sever standing crop material; first and second spaced apart longitudinally disposed reel arms pivotally affixed to said frame adjacent, respectively, said first and second side walls, each said reel arm having a forward end spaced from said reel arm pivot; a reel rotatably mounted between said forward ends of said first and second reel arms, said reel being positioned generally above said cutterbar to engage standing crop material, pull it rearwardly over said cutterbar and convey severed crop material towards said rear wall; a lift means pivotally affixed to each said reel arm between said forward end and said reel arm pivot for selectively rotating said reel arms about said reel arm pivots to effect a raising or lowering of said reel relative to said cutterbar, said lift means being operable within a finite range between a maximum reel height and a minimum reel height, said lift means being adjustably mounted on said frame to selectively vary said minimum reel height relative to said cutterbar; and drive means for operatively powering said reel, said cutterbar and said lift means, an improved adjustable mounting for said lift means on said frame comprising:

a link means pivotally interconnecting said frame at a first link pivot and said lift means at a second link pivot;

a draw bolt anchored to said frame and pivotally connected to said link means remotely of said first link pivot, said draw bolt including actuating means cooperable therewith to rotate said link means about said first link pivot, such that upon manipulation of said actuating means, said lift means is selectively vertically positionable relative to said frame to vary the position of said minimum reel height relative to said cutterbar, said actuating means being operable to infinitely adjust the rotated position of said link means within limits imposed by said draw bolt, said draw bolt being positioned between said frame and said link means such that forces imposed on said draw bolt by the operation of said lift means are tension forces; and a clamping means interconnecting said link means and said frame to lock said link means into a preselected position against said frame such that forces imposed on said draw bolt and said first link pivot during operation of said mobile crop harvesting machine are reduced by at least partially spreading such forces through said clamping means to said frame.

2. The crop harvesting header of claim 1 wherein said reel is adjustably mounted on said first and second reel arms for selective movement along each respective reel arm in a fore-and-aft direction.

3. The crop harvesting header of claim 2 wherein said link means further includes a clamping leg having a slot-shaped opening therethrough, said clamping leg being positioned adjacent said frame, said clamping means including a clamping bolt extending through said slot-shaped opening in said clamping leg for engagement with said adjacent frame member, said clamping bolt being operable to secure said clamping leg against said frame to immobilize said link means.

4. The crop harvesting header of claim 3 wherein an improved adjustable mounting is positioned adjacent said each said side sheet, said lift means including a hydraulic cylinder interconnecting each respective reel arm and the corresponding respective link means, each said hydraulic cylinder being vertically adjustable independently of the other said hydraulic cylinder by manipulation of the respective said actuating means.

5. The crop harvesting header of claim 4 wherein each said link means includes an elongated link having a first end and a remote second end, said first link pivot being positioned at said first end of said elongated link.

6. The crop harvesting header of claim 5 wherein each said draw bolt is connected to the respective said elongated link at a third link pivot, said third link pivot being spaced from both said first and second link pivots.

7. The crop harvesting header of claim 6 wherein each said draw bolt is threaded and anchored to said frame by an anchoring bracket, each said actuating means including at least one nut threaded onto the respective said draw bolt and being cooperable therewith to effect a rotation of the respective said elongated link to adjustably vertically move the respective said hydraulic cylinder to vary the minimum reel height of said reel relative to said cutterbar.

8. The crop harvesting header of claim 7 wherein the distance between said first link pivot and the corresponding said second link pivot is greater than the distance between said first link pivot and the corresponding said third link pivot.

9. The crop harvesting header of claim 8 further including a consolidating auger rotatably mounted between said side walls forward of said rear wall and rearward of said cutterbar, said rear wall including a crop discharge opening therein, said auger being operable to receive severed crop material conveyed rearwardly by said reel, consolidate it and discharge it through said crop discharge opening to said mobile crop harvesting machine for further harvesting treatment.

* * * * *